United States Patent
Lee

(10) Patent No.: US 7,224,657 B2
(45) Date of Patent: May 29, 2007

(54) METHOD FOR COMPENSATING RECORDING END ADDRESS IN AN OPTICAL DISK DRIVE

(75) Inventor: Steve Lee, Taipei (TW)

(73) Assignee: Asustek Computer Inc., Taipei (TW)

( * ) Notice: Subject to any disclaimer, the term of this patent is extended or adjusted under 35 U.S.C. 154(b) by 590 days.

(21) Appl. No.: 10/827,533

(22) Filed: Apr. 20, 2004

(65) Prior Publication Data
US 2005/0002300 A1    Jan. 6, 2005

(30) Foreign Application Priority Data
Apr. 21, 2003    (TW)    .............................. 92109269 A

(51) Int. Cl.
*G11B 7/00*    (2006.01)

(52) U.S. Cl. .................................. 369/53.24; 369/275.3
(58) Field of Classification Search ............. 369/53.29, 369/53.24, 275.3, 53.2, 47.22, 30.04, 30.1, 369/30.16
See application file for complete search history.

(56) References Cited

U.S. PATENT DOCUMENTS 6,628,602 B2 *    9/2003    Ohno et al. .............. 369/275.3

* cited by examiner

*Primary Examiner*—Nabil Hindi
(74) *Attorney, Agent, or Firm*—Rabin & Berdo, P.C.

(57) ABSTRACT

A compact disk (CD) recording end address compensation method is disclosed herein. The recording end address of the original recording session is compared with the recording start address of the second recording session. If two recording sessions are overlapped or staggered, the non-informational area such as pre-gap or Lead-out area is shortened or extended for compensate the mismatch. The invention makes it possible to ensure the desirable data be recorded without missing any piece.

15 Claims, 3 Drawing Sheets

METHOD FOR COMPENSATING RECORDING END ADDRESS IN AN OPTICAL DISK DRIVE

This application claims the benefit of Taiwan application Serial No. 092109269, filed Apr. 21, 2003, the subject matter of which is incorporated herein by reference.

BACKGROUND OF THE INVENTION

1. Field of the Invention

The invention relates in general to a compact disk (CD) recording end address compensation method, and more particularly to the compensation method to avoid the overlapping or staggering defects of recording data on a disk.

2. Description of the Related Art

In the age of technology, an increase in the amount of information, such as the documents, software, MP3, digital pictures and images, demands a high-density storage media. The optical disk such as compact disk (CD-R/CD-RW) and optical disk drives permit the recording of a vast amount of information, thus draw attention for its use as an inexpensive high density and high capacity recording system. However, the reliability of optical disk drive or disk quality could have the effects on the recorded information/data. For example, if the data in a session are recorded by different optical disk drives, the recorded data might be overlapped or staggered due to the differences in performance of optical disk drives. Also, the overlapped or staggered data could still occur while the data are recorded by one optical disk drive with unstable recording quality. The missing pieces of data cannot be retrieved permanently.

CD-R/CD-RW disk contains time-code information called ATIP. ATIP is abbreviation of "Absolute Time In Pre-groove", which means address and recording information encoded in the wobble groove on CD-R and CD-RW media. Based on this information, an optical disk drive (burner) can determine the absolute position in Pregroove. After recording/writing, data are written in CD format synchronizing with ATIP, and this CD coding system including a clock which monitors recording time and predicts a total is so-called "A-time" (Absolute-Time). The A-time address is encoded in Q-channel (Sub-channel) and called "Q-code" (Sub-code) thereinafter. The recording information is recorded in accordance with the time-code information of ATIP, while the recording information is read in accordance with the time-code information of Q-code. Simply saying, the ATIP address and Q-code address are referred to the recording position and reading position, respectively.

FIG. 1 is a schematic showing a normal relationship between the Q-code address and the ATIP address. In the normal recording condition, one Q-code address corresponds to one ATIP address. If it is desirable to read the data corresponded to Q-code address of 8 (Q-code=8), for example, the data encoded in the ATIP address of 8 will be acquired by transformation. Typically, the recording (writing) information in CD-R/CD-RW is continuously performed at a period of time. However, the recording defects such as excursion of the spin motor may occur, and the differences in rotation frequency of recording media will cause the overlapped or staggered recording data.

FIG. 2 is a schematic showing an abnormal relationship between the Q-code address and the ATIP address while the recording data are overlapped. In FIG. 2, data are actually encoded in 9 blocks of ATIP (ATIP address: 0~8), but it only shows 8 blocks of Q-channel (Q-code address: 0~7) are encoded. Since the CD coding system predicts a total according to Q-code, it starts to record the next data from the Q-code address of 8 (corresponding to ATIP address of 8), and the ATIP address of 8 will be used again. The phenomenon as shown in FIG. 2 is called "Q-delay", and the overlapped recording data cannot be retrieved again. One of the reasons for "Q-delay" is that the rotation speed of the spindle motor has been slowed down.

FIG. 3 is a schematic showing an abnormal relationship between the Q-code address and the ATIP address while the recording data are staggered. In FIG. 3, data are actually encoded in 10 blocks of ATIP (ATIP address: 0~9), but it shows 11 blocks of Q-channel (Q-code address: 0~10) are encoded. Since the CD coding system predicts a total according to Q-code, it starts to record the next data from the Q-code address of 11 (corresponding to ATIP address of 11), and the ATIP address of 10 will be blank. The phenomenon as shown in FIG. 3 is called "Q-lead", and the blank area of ATIP has effect on the data retrieve. One of the reasons for "Q-lead" is that the rotation speed of the spin motor has been speeded up.

Whether the phenomenon of "Q-delay" or "Q-lead" arises, it has undesirable effect on the recording result. For example, if the data of music files are overlapped, the software for playing the digital media will try to read the data at the overlapped section back ("read error" or "C2 error"). The next music won't be played until the music file is selected manually. If the data of music files are staggered thus resulting in the blank blocks on the track, an uncorrectable error still arises, though the blank blocks has no significant meaning for music recording.

In addition, the information of file structure on the data track could be ruined due to the phenomenon of "Q-delay" or "Q-lead". Session is a contiguous area of the disk that contains a Lead-in, Program Area, and Lead-out. Lead-In marks the start of each session on the disk, and Lead-Out marks the end of each session on the disk. The main channel in the Lead-in area contains audio or data null information. This area is coded as track zero. The Q Sub-channel in this Lead-in area is coded with the Table of Contents information. The main channel in the Lead-out area contains audio or data null information. Couple of blocks right before the Lead-out area contains file structure information, such as folder name, file name. If the Q-code address mismatches the ATIP address, file structure information in those blocks could be ruined and unable to be found.

Accordingly, it is one of important goals for the engineers not only to ensure that the desirable data can be recorded without missing any piece, but to exclude the possibility of discontinues record.

SUMMARY OF THE INVENTION

It is therefore an object of the invention to provide a compact disk (CD) recording end address compensation method, so as to make it possible to ensure the desirable data be recorded without missing any piece.

The invention achieves the above-identified objects by providing a CD recording end address compensation method, used in a CD record by a optical disk drive. The method is used for preventing at least one overwritten or blank frame (block) between the first (original) recording session and a second recording session, wherein the first (original) recording session and the second recording session are divided by a non-informational area. The method comprises the steps of:

(a) reading out a recording end address A1 of the first recording session;

(b) recording the second recording session continuously, and reading out a recording start address A2 of the second recording session;

(c) detecting the recording end address A1 of the first recording session and the recording start address A2 of the second recording session, if the first recording session and the second recording session being overlapped (A1>A2−1), proceeding to step (d), if at least one blank frame being detected between the first recording session and the second recording session (A1<A2−1), proceeding to step (e);

if the recording start address A2 of the second recording session being normal (A1=A2−1), proceeding the record of the second recording session;

(d) shortening a length of the non-informational area, and recording the non-informational area later; and (e) extending the length of the non-informational area, and recording the non-informational area earlier.

In step (e), the non-informational area is extended by cloning the time information (sub-channel data) of one block (such as 1st block) of the non-informational area. The non-informational area could be a "Pre-gap" having a length of about 2 seconds, or a Lead-out area for making the end of the first recording session.

Also, the compensation method can be used in a disk had not yet been closed, in which more data can be added. The recording end address of the original recording session can be read out from the Lead-in area, and then compared with the recording start address of the following recording session. The compensation method herein is the same as description above, except step (a) is replaced by checking the recording end address of the last recorded data track.

Other objects, features, and advantages of the invention will become apparent from the following detailed description of the preferred but non-limiting embodiments. The following description is made with reference to the accompanying drawings.

DETAILED DESCRIPTION OF THE INVENTION

In the present invention, a compensation method for solving the conventional problems of "Q-delay" and "Q-lead" as described in prior art is provided. First, a recording end address of the first recording session is checked and read out. Then, the second recording session is continuously recorded, and a recording start address of the second recording session is checked to find out if the first and second recording sessions are overlapped or staggered, or not neither. The first recording session and the second recording session are divided by a non-informational area (such as a Pregap). The length of the non-informational area is shortened and the non-informational area is recorded later if the sessions are going to be overlapped. The length of the non-informational area is extended and the non-informational area is recorded earlier if the sessions are going to be staggered (blank frames between two sessions).

A track is logical sub-division of the media. Data items on a CD are not stored in concentric circles. They are rather arranged in an extended spiral-shaped line whose origin is at the center of the CD. The line runs from the in-side to the outside. Those sections on the spiral on which data items are located are called tracks. Up to 99 tracks may be stored on an Audio-CD. One track generally corresponds to one piece of music on the CD.

Session is a contiguous area of the disk that contains a Lead-in, Program Area, and Lead-out. Lead-In marks the start of each session on the disk, and Lead-Out marks the end of each session on the disk. The CD that has been made via only one recording and via multiple recordings is so-called a "single-session disk" and a "multi-session disk", respectively.

A CD-R disk that has been made via multiple recordings. There is an overhead associated with each session that consumes part of the usable storage space on a CD. More than one session can be generated on a CD If only the "close session" is operated instead of "close disk". The "close disk" is the operation in which an "opened" CD can be "closed". No more data can be added in the CD.

Typically, the data are recorded on a CD as a batch, except the one-to-one copy. This CD recorded with data in several sessions is a multi-session disk. Between two sessions, there is 13.5 MB (6750 blocks) including a Lead-out area marks the end of the last session, and a Lead-in area coded with the Table of Contents (TOC) information of the next session.

The present invention provides a compensation method to solve the problems of "Q-delay" and "Q-lead" occurring on a "single-session disk" or a "multi-session disk". Thus, the invention makes it possible to record and retrieve every piece of data. In the following embodiment, "Audio-CD" is taken for illustration. "Audio-CD" means the special "audio CDRs" labeled with something like "For Music use". Up to 99 tracks may be stored on an Audio-CD. One track generally corresponds to one piece of music on the CD.

Figure 4:
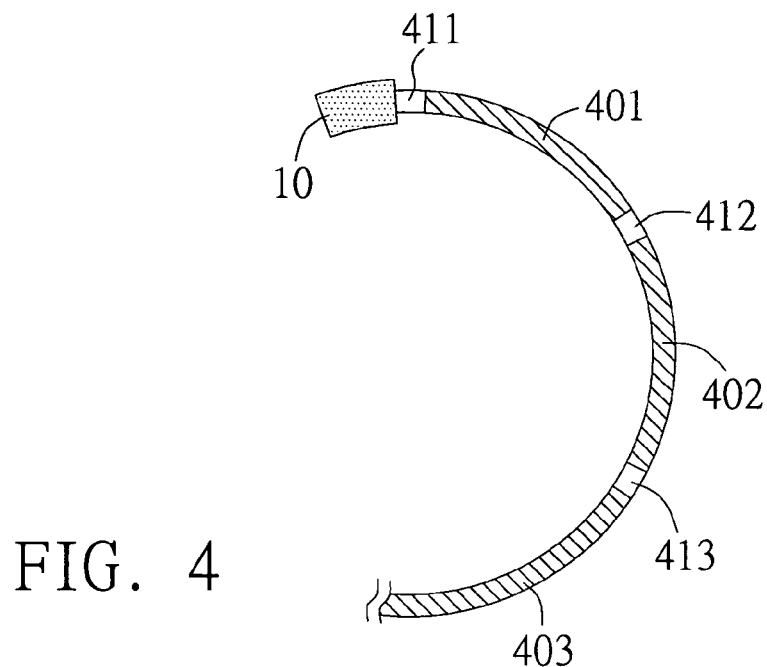
FIG. 4 is a schematic plane view of an Audio-CD for showing data tracks according to an embodiment of the invention.

FIG. 4 is a schematic plane view of an Audio-CD for showing data tracks according to an embodiment of the invention. In a record of Audio-CD, a short section, typically about 2 sec (150 blocks), is generated at the start of every track, called "Pre-gap". Pre-gap is formatted in the same manner as the new track and gives the CD drive time to adjust to the new type of track. The pre-gap area is indicated with pause encoding. In FIG. 4, music files are stored in the data tracks 401, 402, 403 . . . , and the pre-gaps 411, 412, 413 . . . are located at the beginning of the data tracks. The Lead-in area 10, marking the start of each session on the disk, contains TOC data and precedes each program area. The Lead-out area (not shown in FIG. 4), marking the end of each session on the disk, contains audio or data null information.

Figure 1:
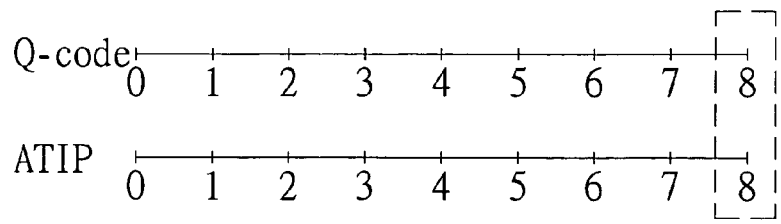
FIG. 1 is a schematic showing a normal relationship between the Q-code address and the ATIP address.
Figure 2:
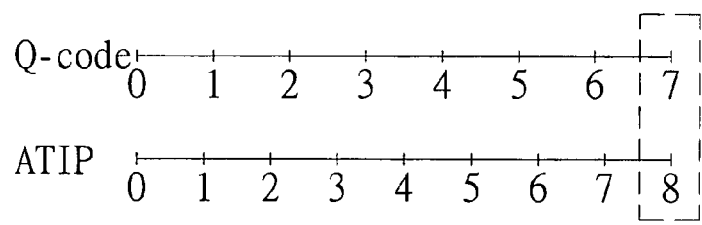
FIG. 2 (prior art) is a schematic showing an abnormal relationship between the Q-code address and the ATIP address while the recording data are overlapped.
Figure 5:
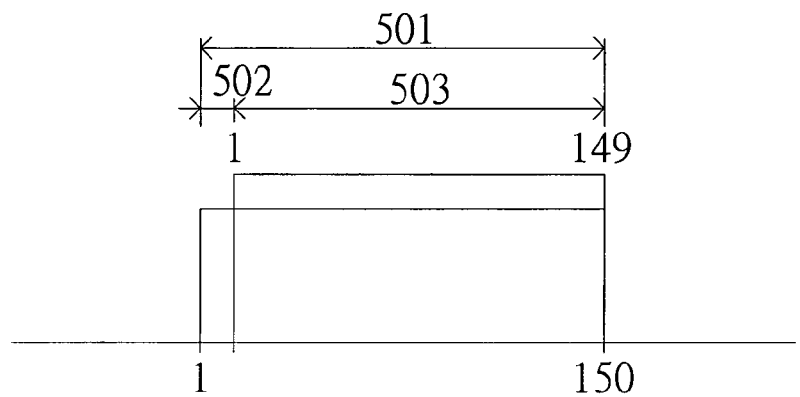
FIG. 5 is a schematic of shortening a Pre-gap according to an embodiment of the invention.

FIG. 5 is a schematic of shortening a Pre-gap according to an embodiment of the invention. If parts of the original recording file address is overlapped by the second recording file address, the pre-gap between two recording files is shortened and encoded later to avoid the phenomenon of "Q-delay" (FIG. 2). In FIG. 5, it is assumed that there is one block of overlapping area, and the length 501 from the 1st block to the 150th block denotes the original pre-gap. According to the compensation method of the invention, the original pre-gap is encoded 1 block later (length 502) and shortened to 149 blocks (1~149, length 503). Since pre-gap contains no significant information, the problem of "O-delay" can be resolved by slightly altering the position of pre-gap with no effect on the recording data on the data tracks.

Figure 3:
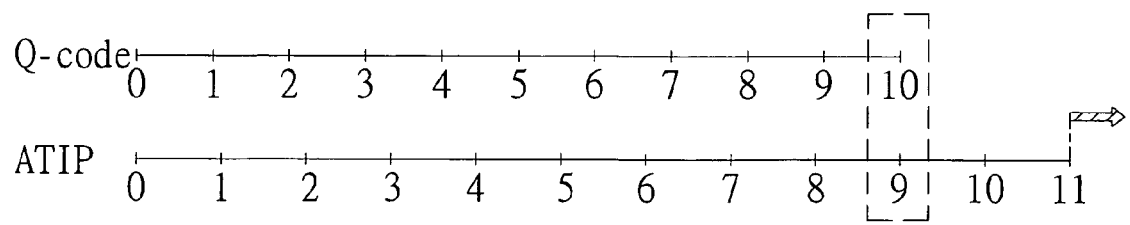
FIG. 3 (prior art) is a schematic showing an abnormal relationship between the Q-code address and the ATIP address while the recording data are staggered.
Figure 6:
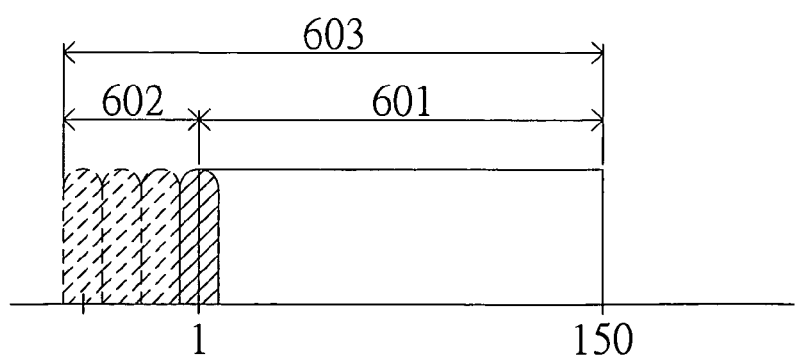
FIG. 6 is a schematic of extending a Pre-gap according to an embodiment of the invention.

FIG. 6 is a schematic of extending a Pre-gap according to an embodiment of the invention. If the original recording file address and the second recording file address are staggered thus generating a few blank blocks, the pre-gap between two recording files is extended and encoded earlier in a dummy way to avoid the phenomenon of "Q-lead" (FIG. 3). In FIG. 6, it is assumed that 3 blank blocks is generated, and the length 601 from the 1st block to the 150th block denotes the original pre-gap. According to the compensation method of the invention, the original pre-gap is extended to 153 blocks (length 603) by cloning the time information of the 1st block for three times (length 602). Since pre-gap contains no significant information, 3 of 1st block cloned in a dummy way have no effect on the recording data, and the problem of "O-delay" can be resolved.

Figure 7:
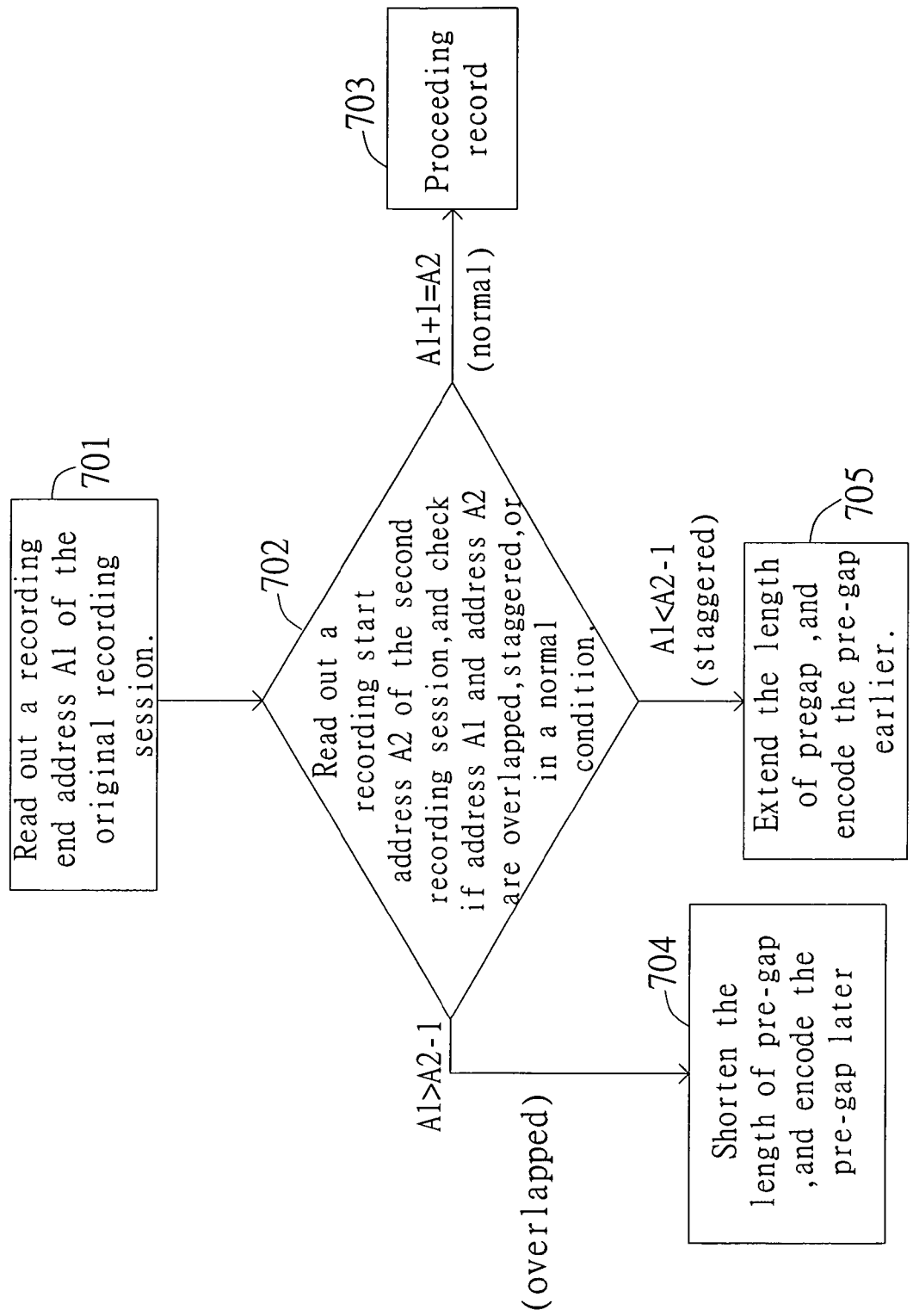
FIG. 7 is a flowchart for explaining a CD recording end address compensation method according to the embodiment of the invention.

FIG. 7 is a flowchart for explaining a method for compensating recording end address of an optical disk according to the embodiment of the invention. First, at step 701, a recording end address A1 of the original (first) recording session is read out. Then, the process proceeds to step 702. The second recording session is continuously recorded on a data track, and a recording start address A2 of the second recording session is read out. Check the recording end address A1 of the original (first) recording session and the recording start address A2 of the second recording session. If the recording start address A2 of the second recording session is normal (A1=A2−1), the process proceeds to step 703 for continuously record. If the original recording session and the second recording session could be overlapped (A1>A2−1), the process proceeds to step 704, for shortening a length of the pre-gap and recording the pre-gap later. if the original (first) recording session and the second recording session are staggered (A1<A2−1), the process proceeds to step 704, for extending the length of the pre-gap and recording the pre-gap earlier. Moreover, a Lead-out area follows the original recording session, it can still be shortened or extended to achieve the compensation according to the invention.

Also, the compensation method according to the description above can be used in a disk had not yet close, in which more data can be added. If the disk had recorded an original recording session, the recording end address A1 of the original recording session can be read out from the Lead-in area, and then compared with the recording start address of the following recording session. The compensation method herein is the same as description of FIG. 7, except step 701 is replaced by checking the recording end address of the last recorded data track.

According to the aforementioned description of compensation method, the recording end address of the original recording session is compared with the recording start address of the second recording session. If two recording sessions are overlapped or staggered, the non-informational area such as pre-gap or Lead-out area is shortened or extended for compensate the mismatch. Also, the recording end address of the original recording session could be obtained from the Lead-out area. The present invention makes it possible to ensure the desirable data be recorded without missing any piece.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for compensating recording end address, used in a optical disk record by an optical disk drive, wherein the method is used for preventing an overlap or a gap between a first recording session and a second recording session, and the first recording session and the second recording session are divided by a non-informational area, the method comprising the steps of:
    (a) reading out a recording end address A1 of the first recording session;
    (b) recording the second recording session continuously, and reading out a recording start address A2 of the second recording session;
    (c) detecting the recording end address A1 of the first recording session and the recording start address A2 of the second recording session,
    if the first recording session and the second recording session being overlapped (A1>A2−1), proceeding to step (d),
    if at least one blank frame being detected between the first recording session and the second recording session (A1<A2−1), proceeding to step (e);
    (d) shortening a length of the non-informational area, and recording the non-informational area later; and
    (e) extending the length of the non-informational area, and recording the non-informational area earlier.

2. The method according to claim 1, wherein the record of the second recording session proceeds if the detection in step (c) is normal (A1=A2−1).

3. The method according to claim 1, wherein the non-informational area is a Pre-gap, dividing the first recording session from the second recording session on a track of the CD.

4. The method according to claim 3, wherein the length of Pre-gap is about 2 seconds.

5. The method according to claim 1, wherein the non-informational area is a Lead-out area for making the end of the first recording session.

6. The method according to claim 1, wherein the length of the non-informational area is extended by cloning a first frame of the non-informational area in a dummy way.

7. A method for compensating recording end address, used in an optical disk recorded by an optical disk drive, wherein the method is used for preventing an overlap or a gap between an original recording session and a second recording session, and the original recording session in the optical disk has not been closed, and a non-informational area divides the original recording session and the second recording session during recording, the method comprising the steps of:
    (a) reading out a recording end address A1 of the original recording session;
    (b) recording the second recording session continuously, and reading out a recording start address A2 of the second recording session;

(c) detecting the recording end address A1 of the original recording session and the recording start address A2 of the second recording session, if the original recording session and the second recording session being overlapped (A1>A2−1), proceeding to step (d), if at least one blank frame being detected between the original recording session and the second recording session (A1<A2−1), proceeding to step (e), if the recording start address A2 of the second recording session being normal (A1=A2−1), proceeding the record of the second recording session;

(d) shortening a length of the non-informational area, and recording the non-informational area later; and (e) extending the length of the non-informational area, and recording the non-informational area earlier.

8. The method according to claim 7, wherein the recording end address A1 of the original recording session is obtained by detecting a Lead-in area of the CD.

9. The method according to claim 7, wherein the non-informational area is a Pre-gap, dividing the original recording session from the second recording session on a track of the CD.

10. The method according to claim 9, wherein the length of Pre-gap is about 2 seconds.

11. The method according to claim 7, wherein the non-informational area is a Lead-out area for making the end of the first recording session.

12. The method according to claim 7, wherein the length of the non-informational area is extended by cloning a first frame of the non-informational area in a dummy way.

13. A method for compensating recording end address, used in an optical disk drive for preventing an overlap or a gap between a first recording session and a second recording session, wherein a recording end address of the first recording session is A1, a recording start address of the second recording session is A2, the first recording session and the second recording session are divided by a non-informational area, the length of the non-informational area is L1 while A2=A1+1, or the length thereof is L2 while A2 A1+1, the method comprising the steps of:

checking the recording end address A1 of the first recording session and the recording start address A2 of the second recording session;

if A2<A1+1, proceeding to step (a);

if A2>A1+1, proceeding to step (b);

(a) shortening a length of the non-informational area, and making A2=A1+1; and (b) extending the length of the non-informational area, and making A2=A1+1.

14. The method according to claim 13, wherein the length of the non-informational area L2 is equal to L1−1 in step (a).

15. The method according to claim 13, wherein the length of the non-informational area L2 is equal to L1+1 in step (b).

* * * * *